(12) United States Patent
Matsubara

(10) Patent No.: US 7,551,774 B2
(45) Date of Patent: Jun. 23, 2009

(54) IMAGE PROCESSING APPARATUS, AND IMAGE PROCESSING METHOD

(75) Inventor: Yoshiaki Matsubara, Tokyo (JP)

(73) Assignee: Sony Corporation, Tokyo (JP)

( * ) Notice: Subject to any disclaimer, the term of this patent is extended or adjusted under 35 U.S.C. 154(b) by 619 days.

(21) Appl. No.: 11/036,998

(22) Filed: Jan. 19, 2005

(65) Prior Publication Data

US 2005/0185839 A1 Aug. 25, 2005

(30) Foreign Application Priority Data

Feb. 19, 2004 (JP) ............................ 2004-043283
Oct. 14, 2004 (JP) ............................ 2004-300495

(51) Int. Cl.
*G06K 9/00* (2006.01)

(52) U.S. Cl. .................. 382/167; 382/162; 382/165; 382/166; 382/274; 358/1.9; 358/522; 358/518; 348/223.1; 348/222.1

(58) Field of Classification Search ................ 382/162, 382/165, 166, 167, 274; 358/1.9, 522, 518; 348/222.1, 223.1, 586
See application file for complete search history.

(56) References Cited

U.S. PATENT DOCUMENTS

| | | | |
|---|---|---|---|
| 5,381,185 A | | 1/1995 | Ohki et al. |
| 6,618,079 B1 | * | 9/2003 | Higuchi .................... 348/223.1 |
| 6,993,362 B1 | * | 1/2006 | Aberg ......................... 455/566 |
| 7,016,075 B1 | * | 3/2006 | Tsukada ....................... 358/1.9 |
| 7,231,085 B2 | * | 6/2007 | Aotsuka ....................... 382/167 |
| 2003/0193579 A1 | * | 10/2003 | Mori et al. ............... 348/222.1 |
| 2005/0231740 A1 | * | 10/2005 | Uchino ......................... 358/1.9 |

FOREIGN PATENT DOCUMENTS

| | | |
|---|---|---|
| EP | 1 324 621 A1 | 7/2003 |
| EP | 1 347 654 A2 | 9/2003 |
| JP | 7-67131 | 3/1995 |
| JP | 10-79954 | 3/1998 |
| JP | 2001-125557 | 5/2001 |
| JP | 2002-95002 | 3/2002 |
| JP | 2003-47020 | 2/2003 |
| JP | 2003-274210 | 9/2003 |
| JP | 2003-348614 | 12/2003 |

\* cited by examiner

*Primary Examiner*—Matthew C Bella
*Assistant Examiner*—Ali Bayat
(74) *Attorney, Agent, or Firm*—Oblon, Spivak, McClelland, Maier & Neustadt, P.C.

(57) ABSTRACT

An image processing apparatus for correcting a hue and a saturation in an input video signal of a moving picture in real time is disclosed wherein the image processing apparatus includes an extracting unit for extracting the hue and the saturation from the input video signal, a determining unit for determining a correcting amount according to the hue and the saturation extracted in the extracting unit, and a correcting unit for correcting the hue and the saturation of the input video signal based on the determination result of the determining unit. Thereby, a desired signal portion of the input video signal is arbitrary corrected in response to the hue and saturation in real time.

8 Claims, 6 Drawing Sheets

IMAGE PROCESSING APPARATUS, AND IMAGE PROCESSING METHOD

CROSS REFERENCE TO RELATED APPLICATION

This application claims priority from Japanese Priority Documents No. 2004-043283, filed on Feb. 19, 2004, and No. 2004-300495, filed on Oct. 14, 2004 with the Japanese Patent Office, which documents are hereby incorporated by reference.

BACKGROUND OF THE INVENTION

1. Field of the Invention

The present invention relates to an image processing apparatus that corrects a hue and a saturation in a video signal, and an image processing method thereof.

2. Description of Related Art

An apparatus for correcting a hue and a saturation in a video signal of a moving picture in real time is generally mounted on a video apparatus such as a television receiver and a television camera for the purpose of a color adjustment or the like.

Conventionally, as an apparatus for correcting a hue of a video signal, there has existed one in which two color-difference signals are color-difference converted in a color-difference signal conversion matrix circuit respectively, these two color-difference converted signals are subjected to slicing respectively, and a color region to be corrected is extracted by taking a minimum value of the two sliced outputs (for example, refer to Japanese Laid-Open Patent Application No. H11-308628).

FIG. 8 is a block diagram showing a configuration example of a color signal extracting circuit of the above-mentioned hue correcting apparatus. In a color-difference signal Cb (=B−Y) and a color-difference signal Cr (=R−Y) which are input to this color signal extracting circuit, the color-difference signal Cb is supplied to variable gain amplifiers 51 and 52, respectively and the color-difference signal Cr is supplied to variable gain amplifiers 53 and 54, respectively. Output of the variable gain amplifier 51 and output of the variable gain amplifier 53 are added in an adder 55, and output of the variable gain amplifier 52 and output of the variable gain amplifier 54 are added in an adder 56.

A color-difference signal conversion matrix circuit 50 is configured with these variable gain amplifiers 51 to 54 and the adders 55 and 56, and a color-difference signal Cb' which is color-difference converted is outputted from the adder 55, and a color-difference signal Cr' which is color-difference converted is outputted from the adder 56.

These color-difference signal Cb' and color-difference signal Cr' are inputted to maximum input extracting circuits 57 and 58, respectively. In addition to these color-difference signal Cb' and color-difference signal Cr', coefficient signals having predetermined values are also inputted to the maximum input extracting circuits 57 and 58, respectively. The maximum input extracting circuits 57 and 58 are such circuits that extract a signal having a maximum value out of the respective two input signals, and function as circuits for slicing the color-difference signal Cb' and the color-difference signal Cr'.

After the inputted coefficient signal to the maximum input extracting circuit 57 is subtracted from the output signal of the maximum input extracting circuit 57 in a subtracter 59, the resultant output signal of the maximum input extracting circuit 57 is inputted to a minimum input extracting circuit 61.

Also, after the input coefficient signal to the maximum input extracting circuit 58 is subtracted from the output signal of the maximum input extracting circuit 58 in a subtracter 60, the resultant output signal of the maximum input extracting circuit 58 is input to the minimum value input extracting circuit 61.

The minimum input extracting circuit 61 is a circuit for extracting a signal having a minimum value out of the two input signals. An output signal of this minimum input extracting circuit 61 is an extracted color signal in which a color region to be corrected is extracted.

FIG. 9 is a diagram illustrating the color region extracted in the color signal extracting circuit of FIG. 8 on a color-difference plane with the color-difference signal Cb and the color-difference signal Cr indicated in the x axis and the y axis, respectively. By adjusting the gains of the variable gain amplifiers 51 to 54, a region A11 interposed between a half line b1 whose angle with respect to the x axis is θ1 and a half line b2 whose angle with respect to the x axis is θ2 is extracted as the color region to be corrected. A half line bm whose angle with respect to the x axis is θm is a point where the extracted color signal becomes maximum.

FIG. 10 is a diagram in which the extracted color signal output from the minimum input extracting circuit 61 is plotted three-dimensionally with respect to the color region shown in FIG. 9 (a diagram with the extracted color signal indicated in the Z axis). The extracted color signal becomes larger as a distance from an origin (a point where both the Cb and Cr are zero) on the color-difference plane becomes larger (that is, the saturation becomes higher), but in an angle direction (hue direction) on the color difference plane, the same curved lines are drawn regardless of the saturation.

SUMMARY OF THE INVENTION

In recent years, there have been increased needs to correct a hue and a saturation of an arbitral signal portion of a video signal arbitrarily in accordance with the desired hue and saturation when performing color adjustment or the like.

However, it has been difficult for the conventional hue correcting apparatus as shown in FIG. 8 to meet such needs in view of the following points (a) to (c) or the like.

(a) When the angles θ1 and θ2 shown in FIG. 9 have values in which the x axis or the y axis exists between the half line b1 and the half line b2 (a point where the angle with respect to the x axis is 0°, 90°, 180° or 270°) as shown in illustrate in FIG. 11, it is difficult to specify the region interposed between the half line b1 and the half line b2, and thus it is difficult to extract the color region.

Furthermore, when a difference between the angles θ1 and θ2 exceeds 90°, the x axis or the y axis necessarily exists between the half line b1 and the half line b2. Therefore, it is also difficult to extract such a large color region that the difference between the angles θ1 and θ2 exceeds 90°.

Thus, since the color region which is able to be extracted as an object to be corrected is limited, it is difficult to correct the portion where the hue is desired to be corrected in the video signal.

(b) By adjusting the gains of the variable gain amplifiers 51 to 54 of FIG. 8, not only the color region to be extracted but also a level of extracted color signal (accordingly, a degree of correction with respect to the extracted color region) are determined. Thus, since the color-difference signal conversion matrix circuit 50 for determining the color region to be corrected functions as a circuit for determining the correcting amount as well, it is difficult to correct the video signal arbitrarily (for example, to correct the hue and the saturation of the video signal independently of each other).

(c) The color signal extracting circuit of FIG. 8 can extract only one color region, as illustrate in FIG. 9. Accordingly, for example, in the case where two or more color regions are extracted for correction respectively as indicated as the regions A11 and A12 in FIG. 12, two or more color signal extracting circuits are necessarily provided, so that this results an increase in circuit size.

In view of the above-mentioned points, the present invention is achieved, making it a problem to provide an image processing apparatus capable of arbitrarily correcting a signal portion where a hue and a saturation are desired to be corrected in a video signal according to the desired hue and saturation, and an image processing method thereof.

In order to solve this problem, an image processing apparatus according to one embodiment of the present invention is an image processing apparatus for correcting a hue and a saturation in an input video signal of a moving picture in real time, and includes an extracting unit for extracting the hue and the saturation from this input video signal, a determining unit for determining a correcting amount according to the hue and the saturation extracted in this extracting unit, and a correcting unit for correcting the hue and the saturation of this input video signal based on the determination result of this determining unit.

In this image processing apparatus, the hue and the saturation are extracted from the input video signal by the extracting unit in real time, respectively. Then, the correcting amount according to the extracted hue and saturation is determined by the determining unit in real time. Furthermore, based on the determination result, the hue and the saturation of the input video signal are corrected by the correcting unit in real time.

Thus, by extracting the hue and saturation of the input video signal respectively and determining the correcting amount according to the extracted hue and the saturation, the signal portion where the hue and the saturation are desired to be corrected in the input video signal can be arbitrarily corrected according to the desired hue and saturation in real time.

As one example, this image processing apparatus further includes separating unit for separating a luminance signal and two color-difference signals from the input video signal, and the extracting unit has a first calculating section which calculates the hue by referring to a look-up table based on a ratio of the two color-difference signals and a second calculating unit which calculates the saturation based on the above-mentioned two color-difference signals.

Furthermore, in this image processing apparatus, as one example, it is preferable that the determining unit can set the correcting amount so as to correct the input video signal with respect to a plurality of regions having different hue to each other. This enables the correction with respect to two or more color regions without bringing about an increase in circuit size.

Furthermore, in this image processing apparatus, as one example, it is preferable that the determining unit has a hue determining unit and a saturation determining unit and that the correcting amount of hue of the input video signal be determined by the hue determining unit and the correcting amount of saturation be determined by the saturation determining unit independently of each other.

Furthermore, in this image processing apparatus, as one example, it is preferable that the determining unit can set the correcting amount in an arbitrary angle range on a color-difference plane with the two color-difference signals indicated in the x axis and in the y axis. Thereby, the correction can be performed for a color region including a signal portion where an angle with respect to the x axis is 0°, 90°, 180°, or 270° and a color region where the angle range with respect to the x axis on the color-difference plane exceeds 90°.

Furthermore, in this image processing apparatus, as one example, it is preferable that the correcting unit corrects the input video signal based on not only the determination result of the determining unit but also a luminance level of the input video signal. Thereby, the signal portion where the hue and the saturation are desired to be corrected in the video signal can be arbitrarily corrected according to the desired luminance level of the video signal as well as the desired hue and saturation.

Next, an image processing method according to the present invention is a method in which a hue and a saturation in an input video signal of a moving picture are corrected in real time, and includes a first step of extracting the hue and the saturation from this input video signal, a second step of determining a correcting amount according to the hue and the saturation extracted in this first step, and a third step of correcting the hue and the saturation of this input video signal based on the determination result of this second step.

According to this image processing method, by extracting the hue and the saturation of the input video signal respectively and determining the correcting amount of according to the extracted hue and saturation, the signal portion where the hue and the saturation are desired to correct in the input video signal can be corrected arbitrarily according to the desired hue and saturation in real time.

DESCRIPTION OF THE PREFERRED EMBODIMENT

Figure 1:
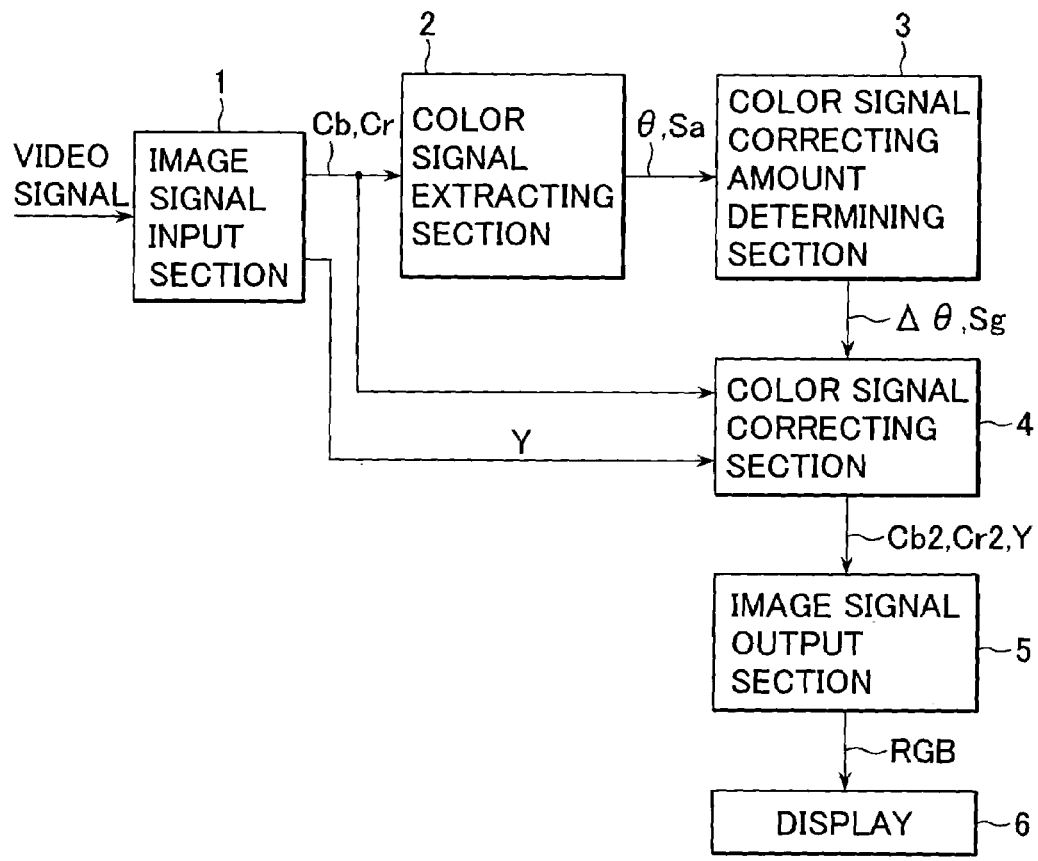
FIG. 1 is a block diagram showing the entire configuration of an image processing apparatus to which one embodiment of the present invention is applied.

Hereinafter, a specific description of one example of the present invention is given referring to the drawings. FIG. 1 is a block diagram showing an entire configuration of an exemplified image processing apparatus to which the present invention is applied. This image processing apparatus is provided in a television receiver of a digital television broadcasting, and a digital video signal obtained by selecting a frequency by a tuner not shown in the figure and by processing a digital demodulation, an error correction, a demultiplexing, and a decoding is inputted into an image signal input section 1.

When video signals RGB of three primary colors is inputted, this image signal input section 1 converts the input video signals RGB to component signals YCbCr, and separates a luminance signal Y and the color-difference signals Cb and Cr from the component signals YCbCr to output them (in the case where the component signals YCbCr are inputted, the luminance signal Y and the color-difference signals Cb and Cr are merely separated from the component signals YCbCr to output them).

The color-difference signals Cb and Cr outputted from the image signal input section 1 are sent to a color signal extracting section 2 and a color signal correcting section 4. Furthermore, the luminance signal Y output from the image signal input section 1 is sent to the color signal correcting section 4.

Figure 2:
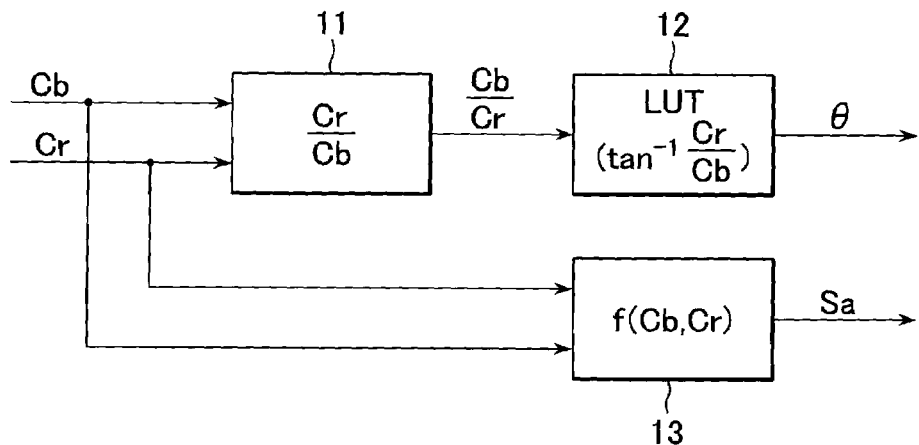
FIG. 2 is a block diagram showing a configuration of a color signal extracting section of FIG. 1.

The color signal extracting section 2 is a circuit that extracts a hue and a saturation from the input color-difference signals Cb and Cr. FIG. 2 shows a detailed configuration of the color signal extracting section 2. The color signal extracting section 2 is composed of a calculating section 11, a LUT (look-up table) 12 and a calculating section 13. The color-difference signals Cb and Cr inputted to the color signal extracting section 2 are sent to the calculating section 11 and the calculating section 13.

The calculating section 11 is an operational circuit that calculates a ratio Cr/Cb of a color-difference signal Cr level with respect to a color-difference signal Cb level for each pixel clock with respect to the input color-difference signals Cb and Cr. A signal indicating the ratio Cr/Cb calculated in the calculating section 11 is sent to the LUT 12.

The LUT 12 includes a ROM which stores a value of the ratio Cr/Cb and a value of an arctangent Cr/Cb corresponding to each other, and outputs a signal θ indicating the value of the arctangent Cr/Cb corresponding to the input ratio Cr/Cb by reading from this ROM for each pixel clock.

Figure 3:
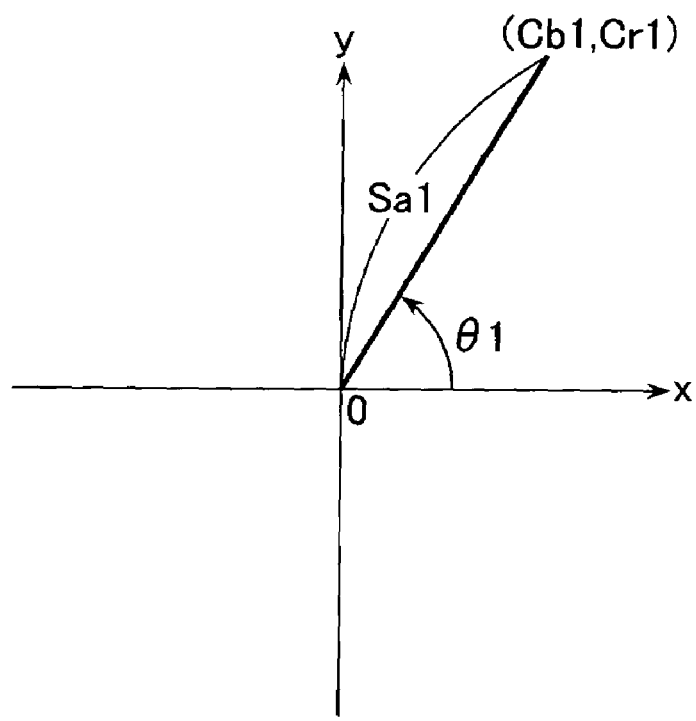
FIG. 3 is a diagram illustrating a hue and a saturation extracted in the color signal extracting section.

FIG. 3 is a diagram showing a value θ1 of the output signal θ of the LUT 12 when the color-difference signals Cb and Cr are at certain levels Cb1 and Cr1 respectively on a color-difference plane with the color-difference signals Cb and Cr indicated in the x axis and in the y axis respectively. As illustrated in this FIG. 3, the output signal θ of the LUT12 indicates the hue of the input video signal to be inputted to this image processing apparatus.

The calculating section 13 is an operational circuit calculating a size of a vector (Cb, Cr) on the color-difference plane of FIG. 3 for each pixel clock on the basis of the input color-difference signals Cb and Cr and outputs a signal Sa indicating the calculated size. As shown in FIG. 3, when the color-difference signals Cb and Cr are at the levels Cb1 and Cr1, a size Sa1 of a vector (Cb1, Cr1) is calculated in this calculating section 13. As shown in FIG. 3, the output signal Sa of the calculating section 13 indicates the saturation of the input video signal to be inputted to this image processing apparatus.

As shown in FIG. 1, the output signal θ of the LUT 12 and the output signal Sa of the calculating section 13 (signals indicating the hue and the saturation of the input video signal) are sent to the color signal correcting amount determining section 3 from the color signal extracting section 2.

Figure 4:
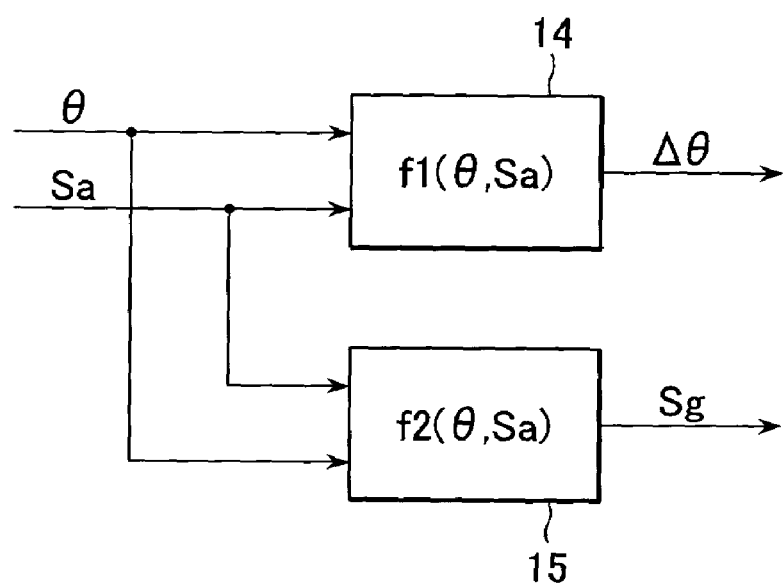
FIG. 4 is a block diagram showing a configuration of a color signal correcting amount determining section of FIG. 1.

The color signal correcting amount determining section 3 is a circuit for determining a correcting amount according to the hue and the saturation extracted in the color signal extracting section 2 by referring to a correcting amount look-up table in the factory setting. For example, for the input video signal having a hue range equivalent to flesh color, the correcting amount of hue which appears slightly reddish is determined, and at the same time, the correcting amount of saturation is determined so as to slightly increase the saturation. Furthermore, a plurality of correcting amount look-up tables are provided, so that a user is able to change this correcting amount by selecting one of the look-up tables, for example. FIG. 4 shows a configuration of the color signal correcting amount determining section 3. The color signal correcting amount determining section 3 is composed of a correcting amount calculating section 14 and a correcting amount calculating section 15. Both the signal θ and the signal Sa inputted to the color signal correcting amount determining section 3 are sent to the correcting amount calculating section 14 and the correcting amount calculating section 15.

The correcting amount calculating section 14 is an operational circuit that determines the correcting amount of hue with respect to the input video signal to be inputted to this image processing apparatus (an increasing and decreasing amount with respect to the original hue) for each pixel clock on the basis of the value of the signal θ and the value of the signal Sa by referring to the correcting amount look-up table, for example, and outputs a signal Δθ indicating the determined correcting amount.

The correcting amount calculating section 15 is a circuit that determines the correcting amount of saturation with respect to the input video signal to be inputted to this image processing apparatus (a magnification with respect to the original saturation) for each pixel clock based on the value of the signal θ and the value of the signal Sa, by referring to the correcting amount look-up table, for example, and outputs a signal Sg indicating the determined correcting amount. The image processing apparatus to which the present invention is applied corrects the hue and the saturation of the input video signal in real time, so that the processing of the color signal extracting section 2, the color signal correcting amount determining section 3 and the color signal correcting section 4 shown in FIG. 1 is performed in real time, respectively.

Figure 5A:
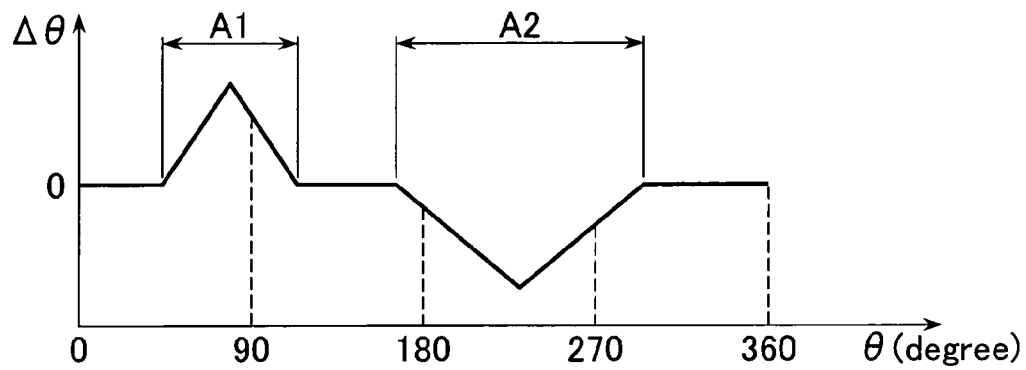
FIGS. 5A and 5B are diagrams illustrating a correcting amount determined in the color signal correcting amount determining section.
Figure 5B:
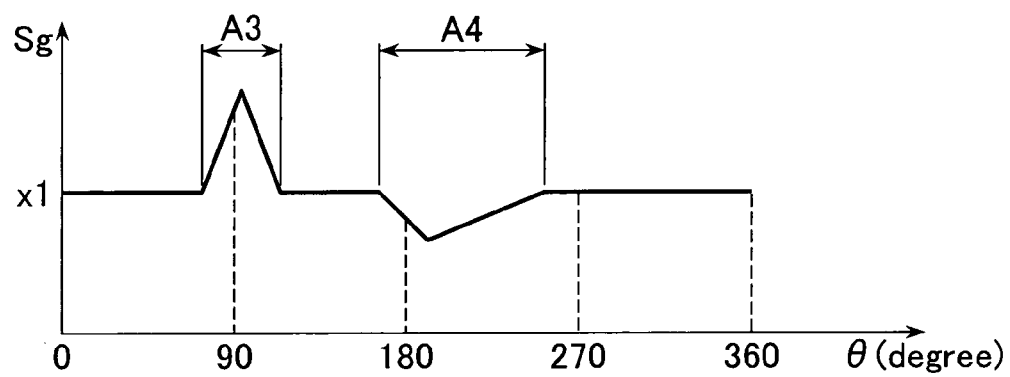

FIGS. 5A and 5B are diagrams showing how the value of the signal Δθ calculated in the correcting amount calculating section 14 and the value of the signal Sg calculated in the correcting amount calculating section 15 vary according to the value of the signal θ in the case where the value of the signal Sa is set to a fixed value. When this fixed value is set to be a different value, the values of these signals Δθ and Sg can be set to be different.

As shown in FIG. 5A, the increasing and decreasing amount of the value of the signal Δθ calculated in the correcting amount calculating section 14 (the correcting amount of hue) is set to plus, that is increasing, in a color region A1 including a point where the angle with respect to the x axis is 90° on the color-difference plane of FIG. 3. Furthermore, the increasing and decreasing amount of the value of the signal Δθ is set to minus, that is decreasing, in a color region A2 including a point where the angle with respect to the x axis is 180° and a point where the angle with respect to the x axis is 270° (a color region where the angle range with respect to the x axis exceeds 90°). In the other regions, the increasing and decreasing amount is set to be zero.

As shown in FIG. 5B, as for the value of the signal Sg calculated in the correcting amount calculating section 15 (the correcting amount of saturation), the magnification is set to be more than 1 in a color region A3 including a point where the angle with respect to the x axis is 90° on the color-difference plane of FIG. 3 and the magnification is set to be less than 1 in a color region A4 including a point where the angle with respect to the x axis is 180°. In the other regions, the magnification is set to be 1.

Thus, in the color signal correcting amount determining section 3, the correcting amount calculating section 14 and the correcting amount calculating section 15 determine the correcting amount of hue and the correcting amount of saturation of the input video signal independently of each other.

Furthermore, as shown in FIGS. 5A and 5B, the correcting amount calculating section 14 and the correcting amount calculating section 15 determine the correcting amount all over the angle range (0° to 360°) on the color-difference plane shown in FIG. 3, respectively, and determine the correcting amount so as to correct the input video signal with respect to a plurality of regions different from each other in hue (in FIG. 5, two regions for each section, that is, A1 and A2, and A3 and A4).

As shown in FIG. 1, the signal Δθ indicating the correcting amount of hue and the signal Sg indicating the correcting amount of saturation are sent to the color signal correcting section 4 from the color signal correcting amount determining section 3.

Figure 6:
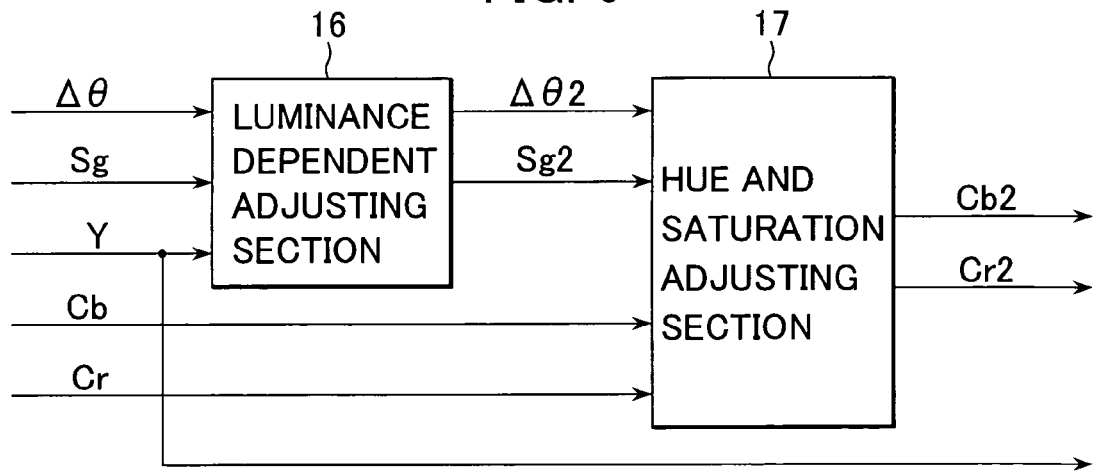
FIG. 6 is a block diagram showing a configuration of a color signal correcting section of FIG. 1.

The color signal correcting section 4 is a circuit for correcting the input video signal to be inputted to this image processing apparatus based on the determination result of the correcting amount in the color correcting amount determining section 3. FIG. 6 shows a configuration of the color signal correcting section 4. The color signal correcting section 4 is composed of a luminance dependent adjusting section 16 and a hue and saturation adjusting section 17. The signal Δθ and the signal Sg input from the color signal correcting amount determining section 3 to the color signal correcting section 4 are sent to the luminance dependent adjusting section 16. Furthermore, the luminance signal Y input from the image signal input section 1 to the color signal correcting section 4 as shown in FIG. 1 is sent to the luminance dependent adjusting section 16 and, at the same time, is output from the color signal correcting section 4 as it is.

The luminance dependent adjusting section 16 is an operational circuit adjusting the levels of the signal Δθ and the signal Sg for each pixel clock according to the level of the luminance signal Y, and outputs a signal Δθ2 indicating an adjusted correcting amount of hue and a signal Sg2 indicating an adjusted correcting amount of saturation.

Figure 7A:
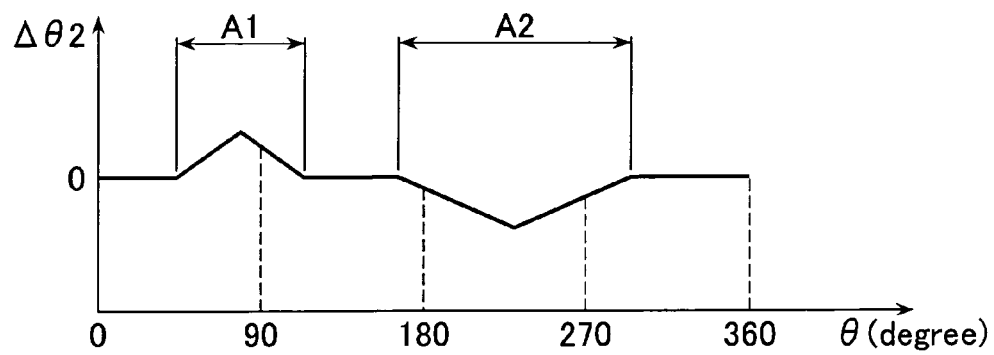
FIGS. 7A and 7B are diagrams illustrating processing of a luminance dependent adjusting section of FIG. 6.
Figure 7B:
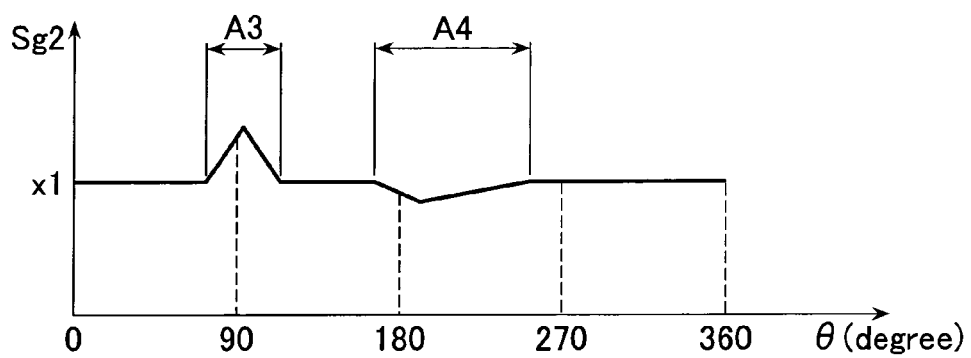
Figure 8:
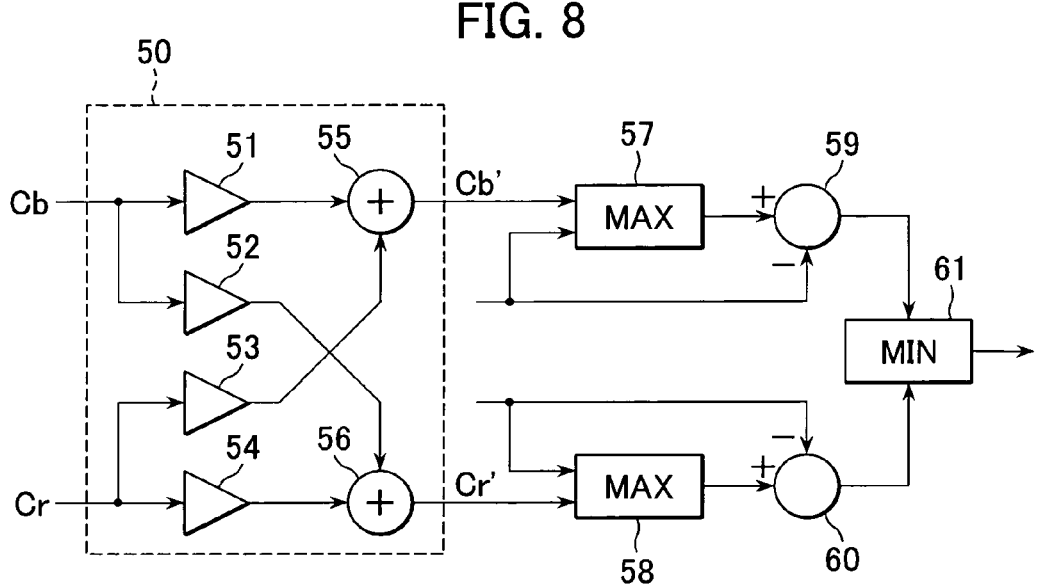
FIG. 8 is a block diagram showing a configuration example of a conventional color signal extracting circuit.
Figure 9:
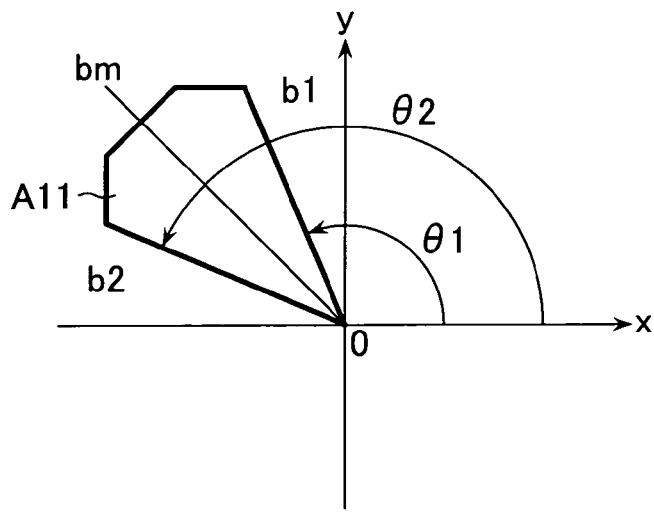
FIG. 9 is a diagram illustrating a color region extracted in the color signal extracting circuit of FIG. 8.
Figure 10:
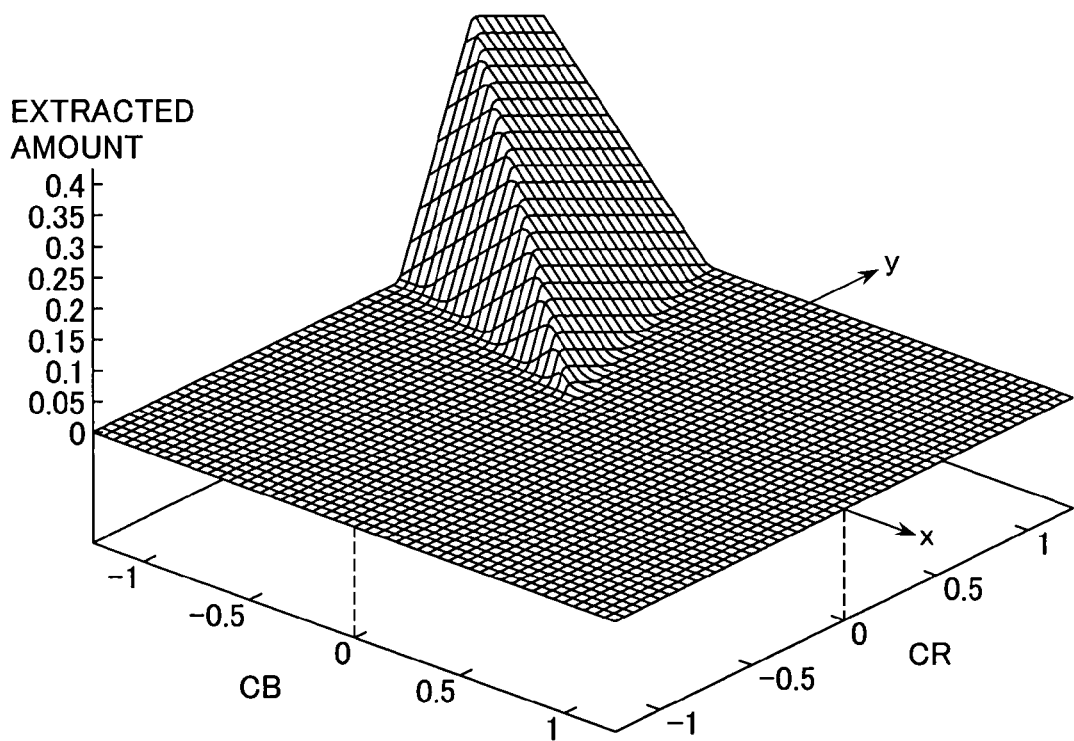
FIG. 10 is a diagram showing an extracted color signal output from the color signal extracting circuit of FIG. 8 with respect to the color region of FIG. 9.
Figure 11:
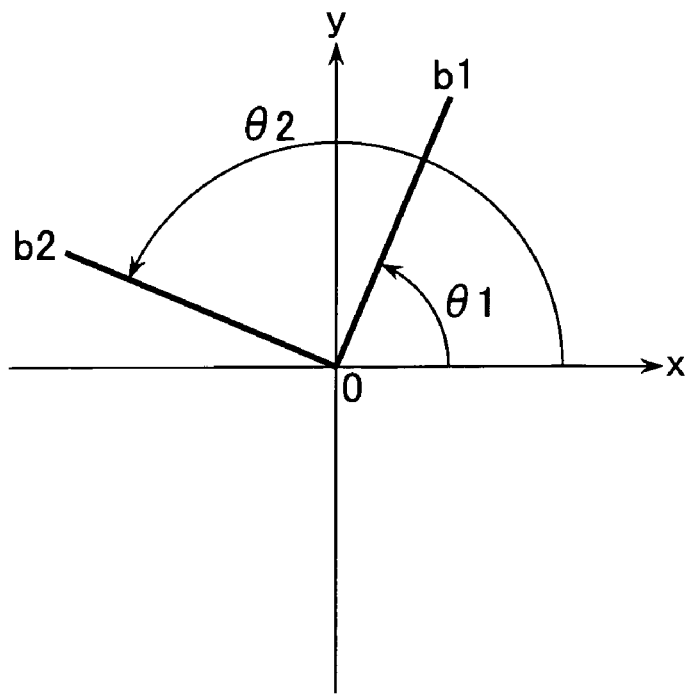
FIG. 11 is a diagram showing an example in which the y axis exists between half lines b1 and b2 of FIG. 9.
Figure 12:
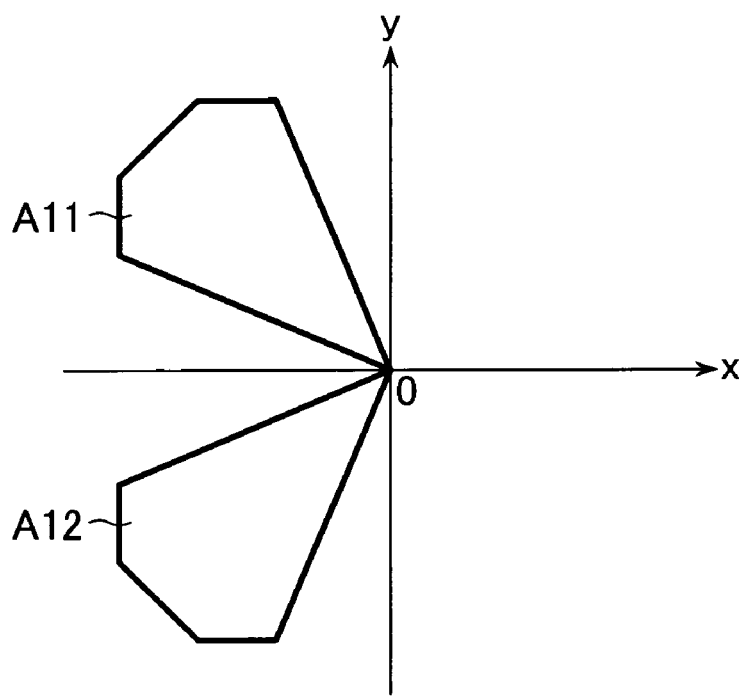
FIG. 12 is a diagram showing an example in which two color regions are attempted to extract.

FIGS. 7A and 7B show how the levels of the signal Δθ and the signal Sg illustrated in FIGS. 5A and 5B are adjusted by the luminance dependent adjusting section 16 in the case where the level of the luminance signal Y is comparatively low. As shown in an example of FIGS. 7A and 7B, the luminance dependent adjusting section 16 suppresses the levels of the signal Δθ and the signal Sg in order to prevent noise from being emphasized in the case where the level of the luminance signal Y is comparatively low (in the case of a dark scene).

The signal Δθ2 and the signal Sg2 output from the luminance dependent adjusting section 16 are sent to the hue and saturation adjusting section 17. The color-difference signals Cb and Cr inputted from the image signal input section 1 to the color signal correcting section 4 as shown in FIG. 1 are also sent to the hue and saturation adjusting section 17. The hue and saturation adjusting section 17 is an operational circuit performing matrix processing in which the hue and the saturation of the color-difference signals Cb and Cr are adjusted by the following formula for each pixel clock by using the signal Δθ2 and the signal Sg2, and outputs adjusted signals Cb2 and Cr2. This matrix processing itself is processing generally performed in a television receiver or the like.

$$\begin{bmatrix} Cb2 \\ Cr2 \end{bmatrix} = Sg2 \begin{bmatrix} \cos(\Delta\theta2) & -\sin(\Delta\theta2) \\ \sin(\Delta\theta2) & \cos(\Delta\theta2) \end{bmatrix} \begin{bmatrix} Cb \\ Cr \end{bmatrix} \quad (1)$$

As shown in FIG. 1, the color-difference signals Cb2 and Cr2 outputted from the hue and saturation adjusting section 17 and the luminance signal Y are sent to an image signal output section 5 from the color signal correcting section 4. The image signal output section 5 converts the color-difference signals Cb2 and Cr2 and the luminance signal Y to the video signals RGB of the three primary colors to sent them to a display (for example, a plasma display panel) 6.

As described above, in this image processing apparatus, the hue and the saturation are extracted from the input video signal by the color signal extracting section 2 in real time, respectively. Then, the correcting amount according to these extracted hue and saturation is determined by the color signal correcting amount determining section 3 in real time. In addition, based on the determination result, the hue and the saturation of the input video signal are corrected by the color signal correcting section 4 in real time.

Thus, by extracting the hue and the saturation of the input video signal respectively and determining the correcting amount according to the extracted hue and saturation, the signal portion where the hue and the saturation are desired to be corrected in the input video signal can be corrected arbitrarily according to the desired hue and the saturation in real time.

Furthermore, since the color signal correcting amount determining section 3 determines the correcting amount of hue and the correcting amount of saturation independently of each other, the hue and the saturation of the video signal can be corrected independently of each other (only the hue can be corrected, only the saturation can be corrected, or both the hue and the saturation can be corrected in different amounts from each other).

Furthermore, since the color signal correcting amount determining section 3 determines the correcting amount so as to correct the input video signal with respect to a plurality of regions different from each other in hue, the correction can be performed with respect to two or more color regions without increasing its circuit size.

Furthermore, since the color signal correcting amount determining section 3 determines the correcting amount all over the angle range (0° to 360°) on the color-difference plane of FIG. 3, the correction can be performed with respect to the color region including the point where the angle with respect to the x axis is 0°, 90°, 180°, or 270° and the color region where the angle range with respect to the x axis exceeds 90° on this color-difference plane as illustrated in FIG. 5.

Furthermore, since the color signal correcting section 4 corrects the input video signal based on not only the determination result of the correcting amount determining section 3 but also the luminance level of the input video signal, the signal portion where the hue and the saturation are desired to be corrected in the video signal can be arbitrarily corrected according to not only the desired hue and the saturation but also the desired luminance level of the video signal.

In the above-mentioned example, the calculating section 13 of the color signal extracting section 2 is designed to calculate the size of the vector (Cb, Cr) on the color-difference plane of FIG. 3. However, the operations of square and square root are required for calculating the size of vector (Cb, Cr), and since the video signal is a moving video picture in this embodiment, these operations need to be processed for each pixel clock in real time, so that an approximate value of the size of the vector (Cb, Cr) may be calculated in the calculating section 13, for example, by approximating by a sum of squares or a sum of respective absolute values in order to reduce load of these operational processing.

Furthermore, in the above-mentioned example, in the color signal extracting section 2, the hue of the input video signal is extracted by using the look-up table and the saturation of the input video signal is extracted by using the operational circuit. However, the present invention is not limited to this, and the hue of the input video signal may be extracted by using an operational circuit and the saturation of the input video signal may be extracted by using a look-up table. Similarly, the color signal correcting amount determining section 3 may also determine the correcting amount of hue and saturation by using a look-up table instead of an operational circuit.

Still further, in the above-mentioned example, the present invention is applied to the receiver for television broadcasting. However, the present invention is not limited to this, but the present invention may be applied to an imaging device such as a television camera, a video recording and reproducing device such as a DVD player, a video editing device or the like.

What is claimed is:

1. An image processing apparatus for correcting a hue and a saturation in an input video signal of a moving picture in real time, comprising:
    a signal separation unit configured to separate a luminance signal, and two color-difference signals from the input video signal;
    an extracting unit configured to extract the hue and the saturation from the input video signal, the extracting unit including
        a first calculating unit configured to calculate the hue based on a ratio of the two color-difference signals with reference to a look-up table; and
        a second calculating unit configured to calculate the saturation based on the two color-difference signals;
    a determining unit configured to determine a correcting amount according to the hue and the saturation extracted by said extracting unit; and
    a correcting unit configured to correct the hue and the saturation of the input video signal based on the determined correcting amount of said determining unit and a luminance level of the input video signal.

2. The image processing apparatus as cited in claim 1, wherein the determining unit is configured to set the correcting amount so as to correct the input video signal with respect to a plurality of regions having different hue to each other.

3. The image processing apparatus as cited in claim 1, wherein
    said determining unit includes a hue determining unit and a saturation determining unit; and
    the correcting amount of the hue of the input video signal is determined by the hue determining unit and the correcting amount of saturation of the input video signal is determined by the saturation determining unit independently to each other.

4. An image processing apparatus for correcting a hue and a saturation in an input video signal of a moving picture in real time, comprising:
    an extracting unit configured to extract a hue and a saturation from the input video signal;
    a determining unit configured to determine a correcting amount according to the hue and the saturation extracted by said extracting unit and configured to set the correcting amount in an arbitrary angle range on a color-difference plane with the two color-difference signals indicated in the x axis and in the y axis; and
    a correcting unit configured to correct the hue and the saturation of the input video signal based on the determined correcting amount of said determining unit and a luminance level of the input video signal.

5. An image processing method for correcting a hue and a saturation in an input video signal of a moving picture in real time, comprising using a processor to perform:
    separating a luminance signal, and two color-difference signals from the input video signal;
    extracting a hue and a saturation from the input video signal. the extracting including calculating the hue based on a ratio of the two color-difference signals with reference to a look-up table, and
    calculating the saturation based on the two color-difference signals;
    determining a correcting amount according to the hue and the saturation extracted; and
    correcting the hue and the saturation of the input video signal based on the determined correcting amount and a luminance level of the input video.

6. The image processing method as cited in claim 5, wherein the correcting amount is set to correct the input video signal with respect to a plurality of regions having different hue to each other in said determining.

7. The image processing method as cited in claim 5, wherein
    said determining includes determining the correcting amount of hue of the input video signal and the correcting amount of saturation of the input video signal independently of each other.

8. An image processing method for correcting a hue and a saturation in an input video signal of a moving picture in real time, comprising using a processor to perform:
    extracting a hue and a saturation from this input video signal;
    determining a correcting amount according to the hue and the saturation extracted, said correcting amount being set in an arbitrary angle range on a color-difference plane with the two color-difference signals indicated in the x axis and in the y axis; and
    correcting the hue and the saturation of the input video signal based on the determined correcting amount and a luminance level of the input video.

* * * * *